United States Patent
Smith (12)

(10) Patent No.: US 6,247,740 B1
(45) Date of Patent: Jun. 19, 2001

(54) WALL DIVIDER SYSTEM FOR USE IN TRUCKS

(75) Inventor: Clayton M. Smith, Blue Springs, MO (US)

(73) Assignee: R.O.M. Corporation, Belton, MO (US)

( * ) Notice: Subject to any disclaimer, the term of this patent is extended or adjusted under 35 U.S.C. 154(b) by 0 days.

(21) Appl. No.: 09/489,547

(22) Filed: Jan. 21, 2000

(51) Int. Cl.[7] .................................................. B62D 33/04
(52) U.S. Cl. .................... 296/24.1; 410/130; 410/131; 410/135
(58) Field of Search .................. 296/24.1, 181; 410/129, 130, 131, 135

(56) References Cited

U.S. PATENT DOCUMENTS

| | | |
|---|---|---|
| 2,725,827 | 12/1955 | Wehby . |
| 3,017,842 | 1/1962 | Nampa . |
| 3,057,284 | 10/1962 | Learmont . |
| 3,144,839 | 8/1964 | Palsson . |
| 3,162,146 | 12/1964 | Knippel et al. . |
| 3,164,395 | 1/1965 | Burch et al. . |
| 3,176,629 | 4/1965 | Shaver . |
| 3,217,664 | 11/1965 | Aquino et al. . |
| 3,298,143 | 1/1967 | Rogers et al. . |
| 3,336,880 | 8/1967 | Johnston . |
| 3,376,599 | 4/1968 | Singer . |
| 3,438,149 | 4/1969 | Ilg . |
| 4,049,311 | 9/1977 | Dietrich et al. . |
| 4,281,870 | 8/1981 | Ehrlich et al. . |
| 4,639,031 | 1/1987 | Truckenbrodt . |

OTHER PUBLICATIONS

The Loadmaker brochure, 1999.

*Primary Examiner*—Joseph D. Pape
(74) *Attorney, Agent, or Firm*—Blackwell Sanders Peper Martin, LLP.

(57) ABSTRACT

A wall divider system (20) for use in a freight vehicle (30) uses double axis hinge assemblies (22) to move insulating partitions (26) from a loaded/closed position to a forklift loading position and from the loaded position to a hand loading position. Each hinge assembly includes wheels (58) rotatably received in tracks (24) to move the partitions (26) along the length of the vehicle (3). Each hinge assembly (22) also includes a hinge shaft (5) pivotal about a first, vertical axis to move the partitions (26) to and from the hand loading position. A hinge pipe (52) is rotatably received on the hinge shaft (50), so that it rotates about a second, horizontal axis to move the partitions (26) to the forklift loading position. A lift assembly (28) is selectively used to lift the partitions into the forklift loading position and hold them there and to return the partitions to the lowered, loaded/closed position.

11 Claims, 4 Drawing Sheets

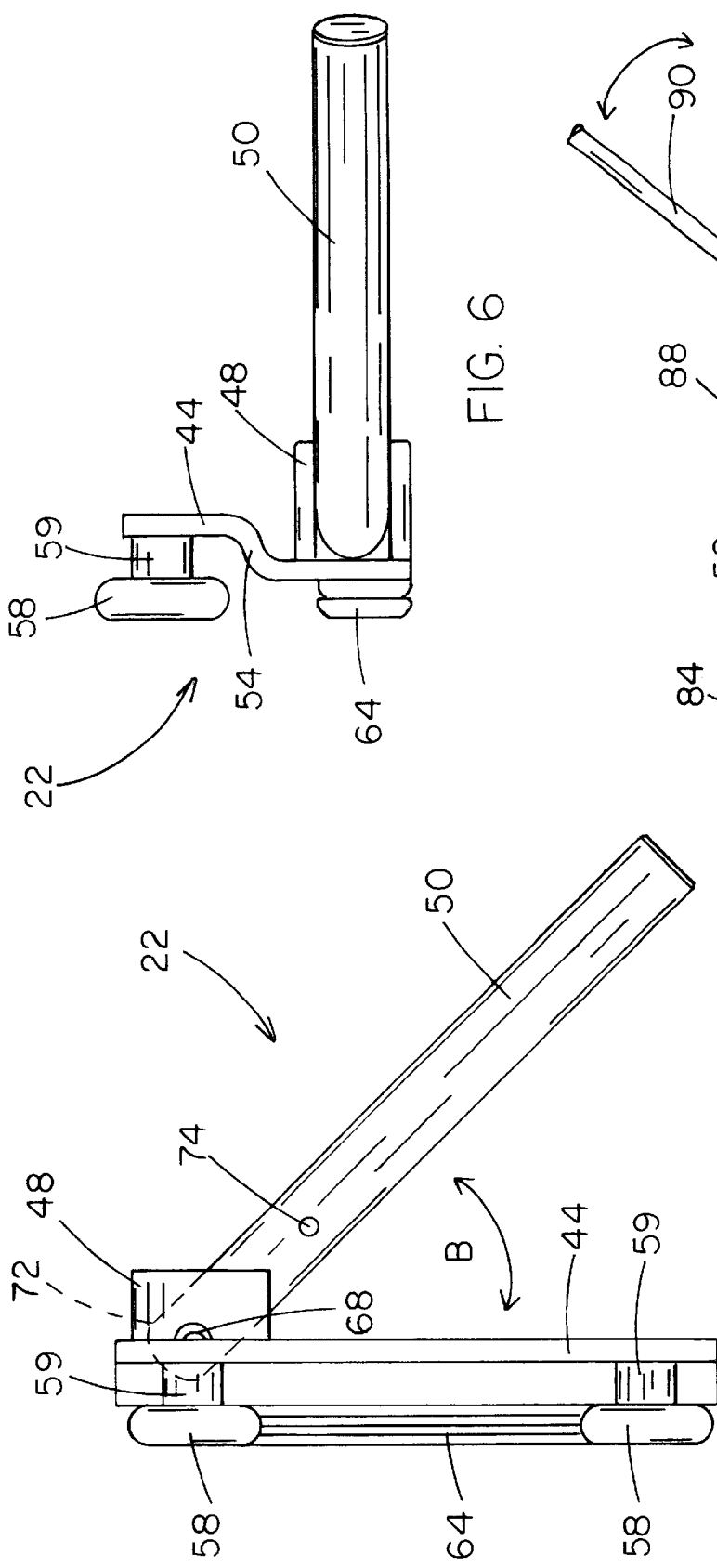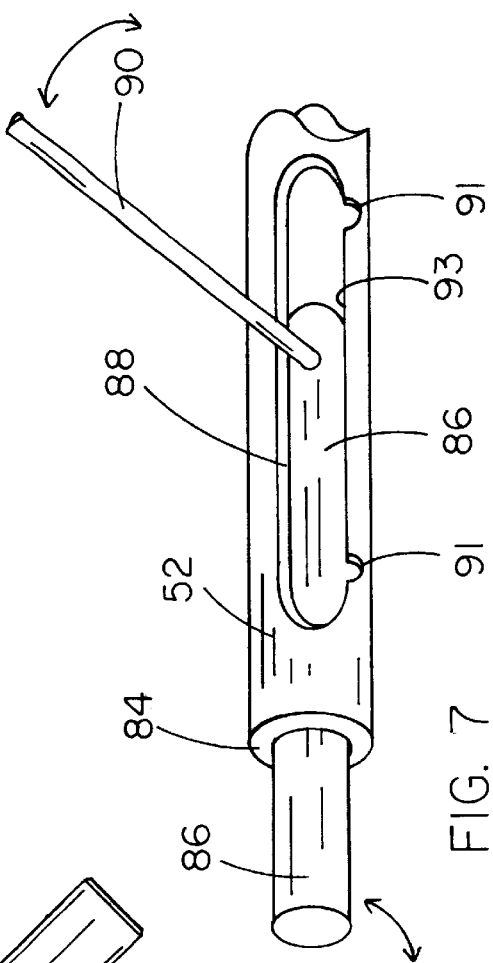

WALL DIVIDER SYSTEM FOR USE IN TRUCKS

BACKGROUND OF THE INVENTION

This invention relates, generally, to portable partitions and, more particularly, to portable insulating partitions positionable along the length of refrigerated truck trailers to partition and insulate the trailers.

To preserve the quality and character of refrigerated goods, such as fresh or frozen food products, during transportation, truck trailers are equipped with refrigeration units or other means for cooling the air in the trailers. If these perishable goods are allowed to warm they can become contaminated with bacteria or mold and be damaged during refreezing. When possible, once the trailer doors are closed, they remain closed until the goods are unloaded, and thus, the trailer's refrigeration system does not work extra to compensate for the loss of cooled air which occurs when the trailer doors are opened. Therefore, when a trailer is fully loaded at a single loading site, then transported to an unloading site where it is fully unloaded, it is usually easy to maintain a sufficiently cool temperature.

Frequently however, a single refrigerated trailer may contain goods which are loaded at separate sites and/or for which are intended to be unloaded at separate sites. If, for example, a single truck is used to deliver refrigerated cargo to a number of purchasers, the typical practice is to load the trailer such that the last load to be delivered is loaded first at the front of the trailer. Succeeding loads can be stacked thereafter in the reverse order in which they are to be delivered. As delivery proceeds, the truck trailer becomes partially emptied. Thus, the refrigeration unit is now cooling the remaining cargo and the empty portion of the trailer as well. Each time the trailer doors are opened and cargo is removed, air cooled by the refrigeration system is lost and warmer air replaces it. The warmer air must then be cooled in order to protect the remaining cargo, thereby increasing transportation costs.

To efficiently maintain the desired temperature, trailers have been provided with movable partitions or bulkheads, which can be repositioned along the length of the trailer. In this manner, the partitions are used to close off portions of the trailers which still retain goods. However, these partitions obstruct and slow the loading process. To minimize obstruction, the partitions have been designed to swing upwardly to a stored position adjacent to the ceiling. This stored position against the ceiling is especially convenient for loading the trailer with a forklift. Other known partitions swing relative to a vertical axis leaving door-like openings between the partitions and the wall. Such door-type partitions are especially suited for loading trailers by hand with dollies. However, no previously available partition is capable of both swinging up to the ceiling and opening like a door.

SUMMARY OF THE INVENTION

There is, therefore, provided in the practice of the invention a novel double axis hinge assembly for use in trucks, which assembly allows a partition to swing up to the ceiling or to pivot horizontally, in the manner of a conventional door, for convenient loading of a freight vehicle by both hand and forklift. The double axis hinge assembly includes a support surface mounting member and a hinge shaft pivotally coupled with the mounting member. The hinge shaft pivots about a first, vertical axis to permit the partition to open like a door. A hinge pipe receives the hinge shaft therein to pivotally couple the hinge pipe and the shaft, and the hinge pipe pivots about a second, horizontal axis, permitting upward swinging of the partition.

Accordingly, it is an object of the present invention to provide an improved wall divider system, which allows convenient loading by hand and by forklift.

In furtherance of this object, the invention is, briefly, a double axis hinge assembly in which the first and second axes define a generally vertical plane perpendicular to a longitudinal axis of the freight vehicle when the partition is in the closed position. A hinge bracket is attached to the mounting member, and the hinge shaft is coupled to the mounting member by the hinge bracket and a hinge pin. Track wheels are preferably provided on the mounting member to permit the hinge assembly to move along a track, and a partition mounting bracket is attached to the hinge pipe. The partition mounting bracket is used to secure a partition on the hinge assembly. A coupler bolt is slidably received in the hinge pipe opposite the hinge shaft. The coupler bolt slides between extended and retracted positions to selectively couple and decouple, respectively, the hinge assembly with another hinge assembly.

It is further contemplated in the practice of the invention that the double axis hinge is used in a wall divider system, which system includes at least one track wheel rotatably received in a track mounting member mounted in a freight vehicle or other large, storage enclosure. The hinge is joined with the track wheel for moving the hinge and a partition attached to the hinge along the track mounting member, along at least a portion of the length of the freight vehicle.

The invention is further, briefly, a truck wall divider system in which a second hinge and partition are joined with the first hinge and partition by a coupler bolt. The hinges operate to pivot the respective partitions about a first axis from a vehicle loaded position, in which the height axis is substantially vertical and the width axis is substantially perpendicular to a freight vehicle longitudinal axis, to a forklift loading position. In the forklift loading position the height axis is substantially horizontal and parallel to the longitudinal axis of the truck and the width axis is substantially perpendicular to the freight vehicle longitudinal axis. The hinges are also operative to pivot the partition about a second axis from the loaded position to a hand loading position, in which the height axis is substantially vertical and the width axis is non-perpendicular to the freight vehicle longitudinal axis. A lift support assembly having a pull rope, hook, and pulley, removably hooks onto the partition to hold it in the forklift loading position.

It is still further contemplated in the practice of the invention that the wall divider system is incorporated in a freight vehicle used to transport products. The freight vehicle has a body including a floor, ceiling, and opposed side walls. A plurality of vehicle wheels support the vehicle body above the ground for movement over the ground. Two of the track mounting members are mounted on the opposed side walls adjacent the ceiling of the freight vehicle, and two hinge assemblies, with attached partitions are movably mounted on the tracks.

These and other goals and advantages of the invention will be in part apparent and in part pointed out herein below.

BRIEF DESCRIPTION OF THE DRAWINGS

FIG. 5 is a top plan view of the hinge assembly of FIG. 2;

FIG. 6 is an end elevational view of the hinge assembly of FIG. 2; and

FIG. 7 is a bottom, fragmentary, perspective view of a coupler bolt and hinge pipe of the hinge assembly of FIG. 1, enlarged for clarity.

Throughout the figures similar reference characters denote similar elements.

DESCRIPTION OF THE PREFERRED EMBODIMENT

Figure 1:
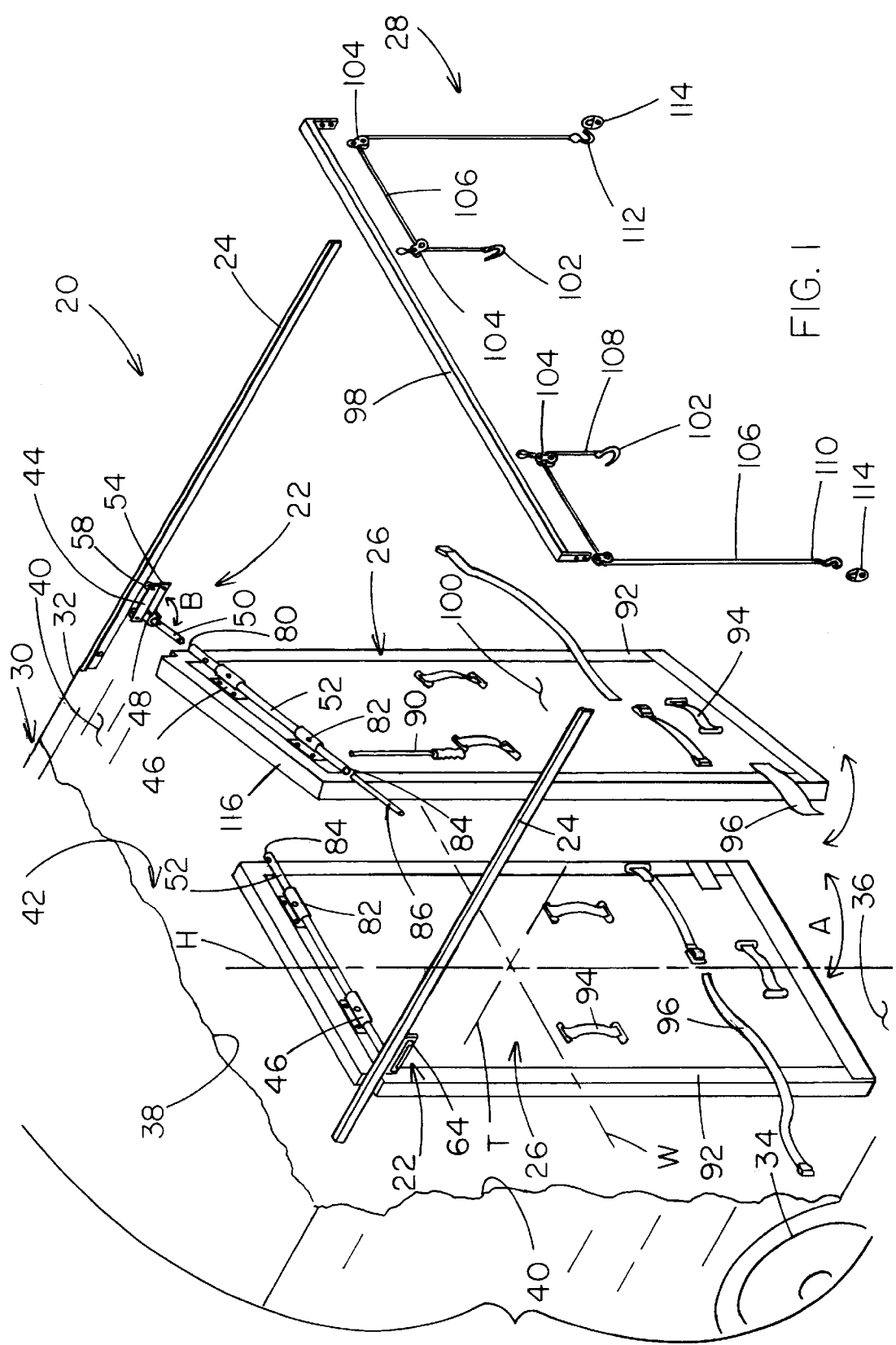
FIG. 1 is a fragmentary, perspective view of a freight vehicle having a wall divider system with a double axis hinge assembly according to the present invention shown exploded.
Figure 2:
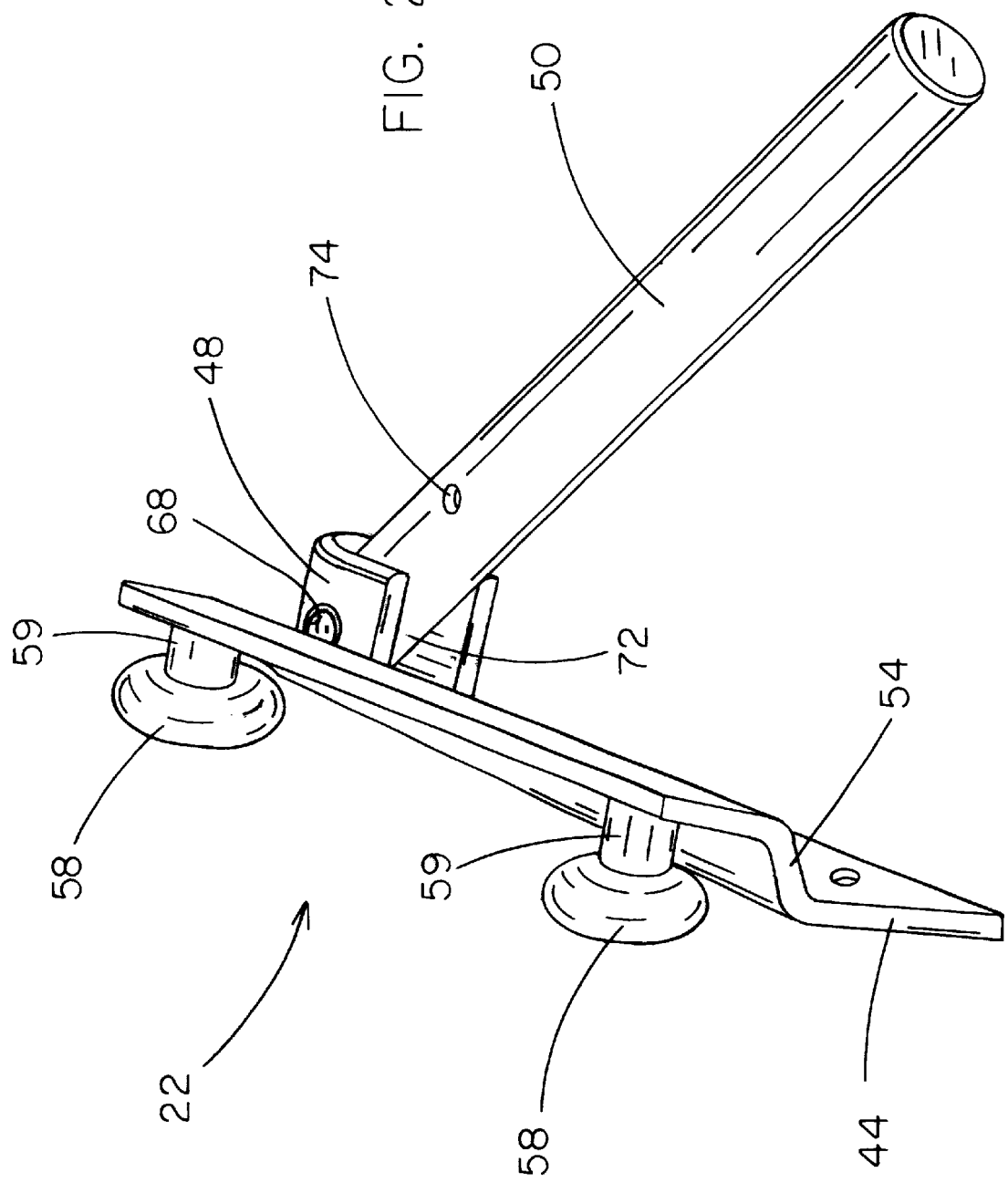
FIG. 2 is a partial, perspective view of the hinge assembly of FIG. 1, enlarged for clarity.

Referring to the drawings in greater detail, FIG. 1 shows a wall divider system 20 constructed in accordance with and embodying the present invention. Wall divider system 20 broadly includes first and second double axis hinge assemblies 22 mounted on first and second tracks 24 and first and second partitions 26 operatively coupled with hinge assemblies 22 to move partitions 26 between closed/loaded positions and open/loading positions. Partitions 26 can be moved to a hand loading position which is convenient for loading by hand (or with a two-wheeled dolly) or to a forklift loading position which is convenient for loading with a forklift. A lift support assembly 28 is provided to hold partitions 26 in the forklift loading position. Clearly, in the forklift position a user can also choose to load by hand, but for purposes of simplicity and clarity of the discussion, the "forklift position" when used herein will always mean a panel has been pivoted upwardly for retention adjacent the ceiling of the truck or other transport vehicle.

A freight vehicle 30, such as a truck trailer or rail car, includes a vehicle body 32 supported above a ground surface by a plurality of vehicle wheels 34, which permit the vehicle 30 to move over the ground surface. Vehicle body 32 has a floor 36, ceiling 38, and opposed side walls 40 defining a cargo area 42 inside the vehicle body. A refrigeration unit (not shown) is preferably, but not necessarily, provided with the vehicle to control the temperature in cargo area 42. Tracks 24 are preferably mounted onto vehicle side walls 40 adjacent ceiling 38 and extend parallel to a longitudinal axis of vehicle body 32. However, as an alternative construction for wider vehicles (e.g., rail cars), it is conceivable that at least one further rail could be mounted with the transport vehicle, parallel to and between two rails 24 shown. In that case, a further panel could be included, movably mounted next to and being interconnectable to adjacent panels, in like manner as described for the version shown. It is further contemplated that the new hinge assembly and wall divider system can be used in a stationary storage container, such as a meat locker or other enclosed space for storage of large quantities of materials which can be moved by hand, or by fork-lift, and such use is considered within the scope of the invention.

Throughout the figures, partitions 26, tracks 24, and hinge assemblies 22 are substantially identical and will generally be described with reference to only one partition, track and hinge assembly using identical reference numerals on the related components of each. Hinge assembly 22 includes a substantially rigid support surface mounting member 44 which mounts the hinge assembly on a support surface such as side wall 40 or preferably track 24, in order to provide longitudinal adjustability . Desirably, at least two partition mounting brackets 46 attach partition 26 to the double axis hinge which includes a hinge bracket 48, hinge shaft 50, and hinge pipe 52.

Support surface mounting member 44, in this embodiment, is an elongated plate with a substantially central step 54. Wheel mounting holes 56 are formed in a section of mounting member plate 44 which is disposed upwardly in normal use position. At least one, but preferably a pair of track wheels 58 is mounted to mounting holes 56 of upper section plate 44 with fasteners 60 such as the rivets shown. Bearing washers 62 are preferably interposed between plate 44 and track wheels 58 to reduce wear. Wheels 58 are also provided with spacers 59 to space them from plate 44. Preferably, a wear pad 64 is attached to a lower section of plate 44 by conventional fasteners 66 such as the screws shown. Wear pad 64 engages side wall 40 as the hinge assembly moves along track 24 and reduces wear on side wall 40. As shown in FIGS. 5 and 6, wear pad 64 desirably extends at least as far from plate 44 as track wheels 58 (or other suitable rotating member, such as a bearing, for example) extend to help guide the track wheels, which are rotatably received in track 24.

Figure 3:
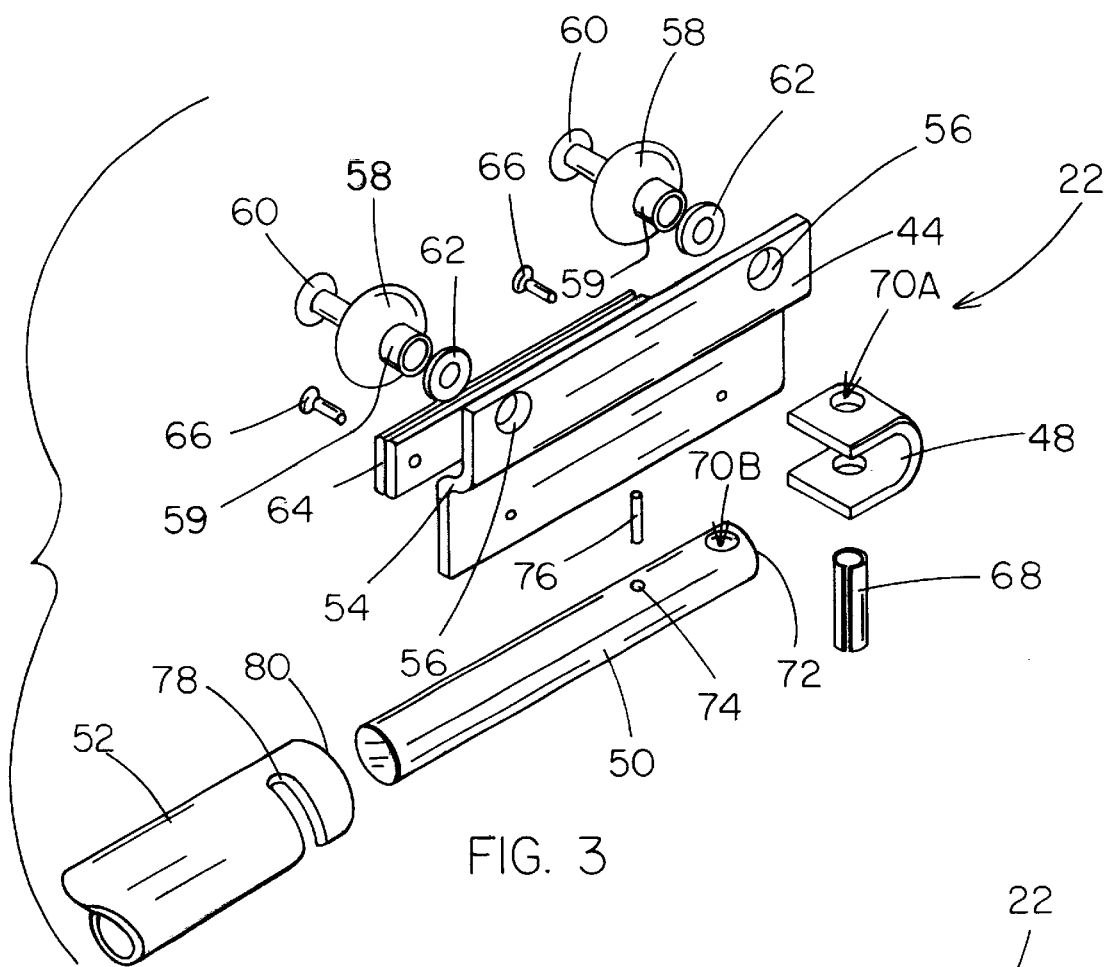
FIG. 3 is a fragmentary exploded, perspective view of the hinge assembly of FIG. 1, enlarged.
Figure 4:
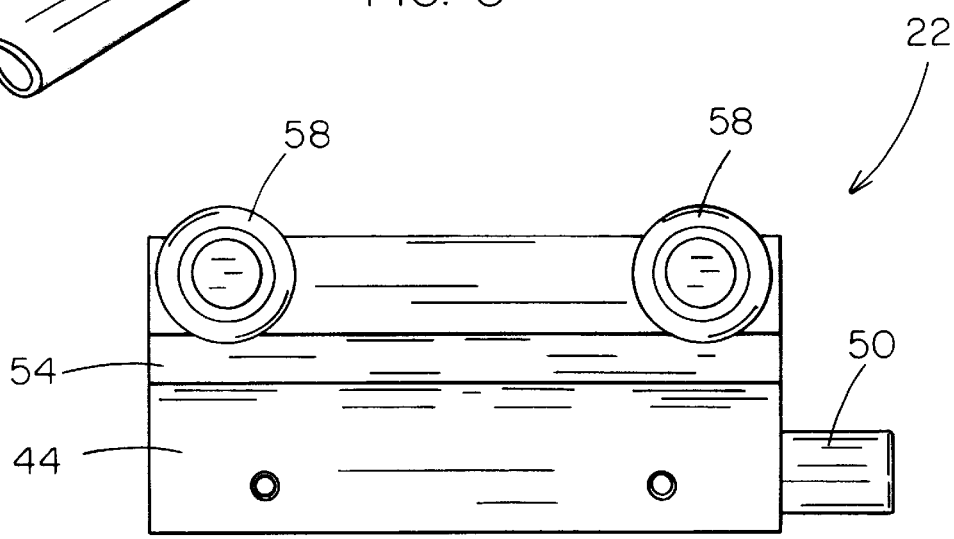
FIG. 4 is a partial, wheel side elevational view of the hinge assembly of FIG. 1 as seen from the left side of FIG. 2.

Referring to FIGS. 3, 5, and 6, hinge shaft 50 is an elongated substantially rigid dowel or rod, one end of which is received in hinge bracket 48 and pivotally retained therein by a hinge pin 68 which can be a roll pin or other suitable device. Hinge bracket 48 is U-shaped and attached to the lower section of plate 44 along one open side of hinge bracket 48. A hinge pin opening 70A extends through the legs of the bracket is alignable with a similarly sized opening 70B in pivot end 72 of hinge shaft 50, and hinge pin 68 extends through hinge pin openings 70A, 70B to pivotally couple the hinge bracket and hinge shaft 50. Thus, hinge bracket 48 and hinge pin 68 pivotally couple hinge shaft 50 and connected hinge pipe 52 with the support surface mounting member 44. To allow hinge shaft 50 to pivot freely in the hinge bracket 48, pivot end 72 of the pivot shaft is rounded. Preferably, pivot end 72 is a portion of a sphere as best illustrated in FIGS. 5 and 6. A further pin opening 74 is formed in shaft 50 parallel to hinge pin opening 70. A securement pin 76 extends through pin opening 74 to selectively releasably hold hinge pipe 52 on shaft 50.

Referring to FIGS. 1, 3, and 7, hinge pipe 52 is an elongated substantially rigid cylinder rotatably received on pivot shaft 50. A circumferentially extending pin slot 78 is formed adjacent a shaft receiving end 80 of pipe 52 and extends over 90° of the circumference of the hinge pipe in an upper outer quadrant of the pipe facing away from the partition. Securement pin 76 extends from shaft 50 into pin slot 78. Thus, securement pin 76 holds the pipe on the shaft while the pin slot allows the pipe to rotate around the shaft and securement pin. Pipe 52 extends through substantially cylindrical openings in partition mounting brackets 46, which are fixedly attached to partition 26 and preferably reinforced by back plates (not shown) on the opposite side of partition 26. The pipe is longitudinally and rotationally fixed relative to the partition mounting brackets by tension pins 82, which extend through brackets 46 and pipe 52. Pipe 52 also includes a coupler end 84 opposite shaft end 80. An elongated coupler bolt 86 is slidably received in coupler end 84 and slides between extended and retracted positions. When coupler bolt 86 is in the extended position and partitions 26 are in the closed positions, coupler bolt 86 extends into the pipe of the other hinge assembly to couple the two adjacent hinge assemblies and support the partitions in the forklift loading position. When coupler bolt 86 is in the retracted position, the two hinge assemblies can be separated allowing the partitions to move into the hand loading positions. A longitudinally extending coupler slot 88 is formed adjacent coupler end 84 of pipe 52 on a generally downwardly facing portion of pipe 52. The coupler bolt is long enough to overlap elongated coupler slot 88. An extension handle 90 extends through and slides in coupler slot 88, and handle 90 attaches to coupler bolt 86. By grasping handle 90, an operator slides coupler bolt 86 between the extended and retracted positions to selectively join or separate two hinge assemblies 22. Preferably, lock slots 91, or some equivalent detenting mechanisms, are formed near or adjacent the opposed ends of coupler slot 88 along the lower edge 93 thereof. Coupler slot 88 is preferably formed in the lower outer quadrant of the hinge pipe circumference opposite the partitioning, so that slot 88 is above the bottom of the hinge pipe. In the embodiment shown, lock slots 91 extend downwardly from coupler slot 88, although other arrangements may be conceived which will suffice. Thus, when the coupler bolt is extended to couple hinge assemblies 22, gravity draws handle 90 into the lock slot closest to hinge pipe coupler end 84 to restrict linear movement of handle 90 and lock couple bolt 86 in the extended position, and when the coupler bolt is retracted, gravity draws the handle into the opposite lock slot spaced from the coupler end to lock the coupler bolt in the retracted position. To release the coupler bolt, the operator simply pivots handle 90 and bolt 86, so that the handle moves away from the partition until the handle is in a movable position in coupler slot 88.

Referring to FIG. 1, track 24 is an elongated channel member configured to receive track wheels 58 of hinge assembly 22. Preferably, the track is substantially rigid and mounted on opposed side walls 40 although other locations are openable. Track 24 mounts the hinge assembly to vehicle 30 and guides the hinge assembly and partition along the length of the vehicle in a direction parallel to the longitudinal axis of vehicle 30. In this case, it is preferred that track 24 is sufficiently strong as to be capable of supporting a plurality of sets of panels 26 on assemblies 22 along the length of the tracks. If desired, support surface mounting member 44 can be mounted directly on the vehicle surface, so that the hinge assembly and partition are stationary.

Partition 26 is substantially flat and preferably formed with an insulating material and a perimeter seal assembly 92, which seals against floor 36, ceiling 38 and walls 40 of vehicle 30. Partition 26 is provided with handles 94 for grasping and moving the partition. The partition also includes closure straps 96, which cooperate with the other partition to hold the partitions together in the loaded and forklift loading positions. The partition has a height extending along a height axis H. The height is sized to sealably extend between floor 36 and ceiling 38. The partition also has a width extending along a width axis W and a thickness extending along a thickness axis T. The thickness is selected to provide the desired insulating properties, and the width is sized to extend approximately half way between opposed walls 40. Thus, two partitions combine to divide and seal off cargo area 42. Alternatively, a single partition is sized to divide and seal off cargo area 42, but bifurcated partitions 26 are preferred because of the reduced weight and bulk.

Lift support assembly 28, in the embodiment shown, is mounted, with a mounting bar 98, inside cargo area 42 on ceiling 38 of vehicle 30 a hinge side 100 of the partition, and lift assembly 28 is spaced from the hinge assembly by a distance approximately equal to the height of the partition. If desired, wheels are provided on mounting bar 98, so that the lift assembly moves along track 24. Lift assembly 28 has two substantially identical sides and each side includes a partition hook 102, two pulleys 104, and a pull rope 106. Pulleys 104 are mounted on bar 98, and rope 106 slidably extends over pulleys 104. Partition hook 102 is attached to an inner end 108 of the rope and is configured to hook onto partition 26 or lower partition handle 94. Outer end 110 of rope 106 is provided with a lock hook 112 which hooks onto a catch 114 mounted on wall 40. To hold the partition in the forklift loading position, partition hook 102 is attached to the partition, and partition 26 is moved to the forklift loading position. Lock hook 112 is then hooked on catch 114. If desired, the lift assembly is used to raise and lower the partitions into and out of the forklift loading position. Certainly lift assembly 28 could be substituted with other useful structures, such as a transportable spring tension counter balance assembly (not shown), for example.

In operation, partitions 26 are moved along track 24 to a desired location in vehicle body 32 where a separation of the cargo area is desired. If vehicle 30 is to be loaded or unloaded using a forklift, partitions 26 are pivoted about a first, horizontal axis from the loaded position to the forklift loading position. Arrows A in FIG. 1 indicate the lift and return directions of a panel 26 as they pivot on the horizontal first axis. In the loaded position, the partition height axes are substantially vertical and the partition width axes are still substantially perpendicular to the freight vehicle longitudinal axis in a horizontal plane. In the forklift loading position, the height axes are substantially horizontal and the width axes are substantially perpendicular to the freight vehicle longitudinal axis. Thus, partitions 26 are adjacent and substantially parallel to ceiling 38 when they are in the forklift loading position. With the partitions held against ceiling 38, a forklift is free to drive in and out of cargo area 42 without obstruction by the partitions. The partitions can be pivoted individually or pivoted together when coupler bolt 86 in its extended position joining the two hinge assemblies. The first axis is defined by the relative rotation between shaft 50 and pipe 52.

If vehicle 30 is to be loaded or unloaded by hand, partitions 26 (or at least one of them) are pivoted about second, vertical axes from the loaded position to the hand loading position, as indicated by arrows B in FIGS. 1 and 5. In the hand loading position, the height axes are substantially vertical and the width axes are non-perpendicular to the freight vehicle longitudinal axis in a horizontal plane. If desired, the partitions can be opened to the extent that they are parallel to the walls, and the width axes are parallel to the longitudinal axis. Thus, individuals are free to move around the partitions with minimal obstruction, and without taking the extra effort to secure the partitions against ceiling 38. The second axes are defined by hinge pins 68, which are located adjacent walls 40. Thus, the partitions open at the center of cargo area 42 not along the walls. Further, when a partition is in the closed, loading position, the first and second axes together define a generally vertical plane substantially perpendicular to the longitudinal axis of vehicle 30.

When the partitions 26 are returned to the closed positions, they are not permitted to move substantially beyond the closed positions. To achieve this, shaft 50 contacts the base of U-shaped hinge bracket 48, and securement pins 76 contact the top ends of pin slots 78. Further, because top edges 116 (FIG. 1) of partitions 26 contact ceiling 38, it is not possible to move the partitions directly from one loading position to another. It is necessary to return the partitions substantially to the loaded position before changing their position from hand loading position to forklift holding position, or vice versa.

Thus, a wall divider system 20 is disclosed which utilizes a double axis hinge to move a partition to a selected one of two open positions thereby increasing the convenience of loading the freight vehicle both by forklift and by hand. While preferred embodiments and particular applications of this invention have been shown and described, it is apparent to those skilled in the art that many other modifications and applications of this invention are possible without departing from the inventive concepts herein. For example, the hinge shaft and pipe could be interchanged, so that the pipe is attached to the hinge bracket and the shaft attaches to the partition mounting brackets. Also, the support surface mounting member could have some shape other than being elongated and stepped as shown. It is, therefore, to be understood that, within the scope of the appended claims, this invention may be practiced otherwise than as specifically described, and the invention is not to be restricted except in the spirit of the appended claims. Although some of the features of the invention may be claimed in dependency, each feature has merit if used independently.

In view of the foregoing, it will be seen that the several objects of the invention are achieved and other advantages are attained. Although the foregoing includes a description of the best mode contemplated for carrying out he invention, various modifications are conceivable. As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A wall divider system for use in dividing a space of a storage container, the wall divider system comprising:
   at least one partition having a height sized to extend between a floor and a ceiling of the storage container;
   a double axis hinge operatively coupled with each partition of the at least one partition, to pivot the partition coupled thereto about two axes;
   at least one rotatable member coupled with each double axis hinge; and
   a track mounted in the storage container, the track receiving the rotatable member to permit selective movement of the hinge and partition along the track.

2. The wall divider system according to claim 1 wherein the at least one partition comprises a first partition and a second partition having a height sized to extend between the floor and the ceiling of the storage container and a width sized to extend approximately half way between opposed side walls of the storage container.

3. The wall divider according to claim 2 further comprising a coupler bolt extending between the first double axis hinge and the second double axis hinge.

4. The wall divider system according to claim 1 further comprising a lift support assembly including a partition hook for engaging the partition, a pulley, a pull rope operatively engaging the pulley and the rope having opposite rope ends with one rope end being attached to the partition hook, and a securement hook attached to another rope end to thereby hold the partition, when selectively connected to the partition hook, in an up position.

5. The wall divider system according to claim 1 wherein the double axis hinge includes a hinge shaft coupled with the at least one rotatable member to permit movement of the double axis hinge along the track, and the hinge shaft being operable to pivot the partition relative to a substantially vertical axis; and a hinge pipe receiving the hinge shaft therein to pivotally couple the hinge pipe with the hinge shaft for pivoting the partition relative to a substantially horizontal axis.

6. A wall divider system for use in dividing a space of a storage container, the wall divider system comprising:
   a partition having a height sized to extend between a floor and a ceiling of the storage container, a partition height axis, and a partition width axis; and
   a double axis hinge operatively coupled with the partition to pivot the partition about a first axis from a loaded position, in which the height axis is substantially vertical and the width axis is substantially perpendicular to a longitudinal axis of the storage container, to a fork lift loading position, in which the height axis is substantially horizontal and the width axis is substantially perpendicular to the storage container longitudinal axis, and to pivot the partition about a second axis from the loaded position to a hand loading position, in which the height axis is substantially vertical and the width axis is non-perpendicular to the longitudinal axis of the storage container.

7. The wall divider system according to claim 6 further comprising at least one rotatable member operatively coupled with the double axis hinge, and a track member for mounting in the storage container, the at least one rotatable member being received in the track for moving the double axis hinge and partition along the track.

8. The wall divider system according to claim 6 wherein the partition comprises an insulating partition having a perimeter seal assembly.

9. A freight vehicle for transportation of products, the vehicle comprising:
   a vehicle body including a floor, a ceiling, and opposed side walls;
   a plurality of vehicle wheels supporting the vehicle body above a ground surface and permitting movement of the vehicle body over the ground surface; and
   a wall divider system mounted in the vehicle body including:
      at least one partition having a height sized to extend between a floor and a ceiling of the freight vehicle;
      a double axis hinge operatively coupled with each partition of the at least one partition to pivot the partition to which the double axis hinge is operatively coupled about two axes;
      at least one rotating member rotatably coupled with each double axis hinge; and
   a track mounted in the freight vehicle, the track receiving the at least one rotatable member to move the at least one double axis hinge and partition coupled thereto along the track to thereby selectively place the at least one partition longitudinally within the vehicle body.

10. The vehicle according to claim 9 wherein the at least one partition comprises a first partition and a second partition, each of the first partition and the second partition having a height sized to extend between the floor and ceiling of the freight vehicle and a width sized to extend approximately halfway between opposed side walls of the fright vehicle.

11. The vehicle according to claim 9 further comprising a lift support assembly including a partition hook for engaging the partition, a pulley, a pull rope operatively engaging the pulley, the rope having opposite rope ends with one rope end being attached to the partition hook, and a securement hook attached to another rope end to thereby hold the partition, when selectively connected to the partition hook, in an up position.

* * * * *